(12) United States Patent
Veronese (10) Patent No.: US 11,499,774 B2
(45) Date of Patent: Nov. 15, 2022

(54) RAPID COOLING DEVICE

(71) Applicant: MAVITEC TORNEARIA E MANUTENCAO LTDA—ME, Arroio Do Meio (BR)

(72) Inventor: Alexandre Veronese, Arroio de Meio (BR)

(73) Assignee: MAVITEC TORNEARIA E MANUTENCAO LTDA—ME, Arroio Do Meio (BR)

(*) Notice: Subject to any disclaimer, the term of this patent is extended or adjusted under 35 U.S.C. 154(b) by 176 days.

(21) Appl. No.: 16/645,479

(22) PCT Filed: Sep. 6, 2018

(86) PCT No.: PCT/BR2018/000053
§ 371 (c)(1),
(2) Date: Mar. 8, 2020

(87) PCT Pub. No.: WO2019/046916
PCT Pub. Date: Mar. 14, 2019

(65) Prior Publication Data
US 2020/0284505 A1 Sep. 10, 2020

(30) Foreign Application Priority Data
Sep. 8, 2017 (BR) .......................... 1020170192288

(51) Int. Cl.
*F25D 31/00* (2006.01)
*F25D 17/06* (2006.01)
*F25D 29/00* (2006.01)

(52) U.S. Cl.
CPC .......... *F25D 31/007* (2013.01); *F25D 17/065* (2013.01); *F25D 29/00* (2013.01); *F25D 2331/803* (2013.01); *F25D 2331/805* (2013.01); *F25D 2400/28* (2013.01)

(58) Field of Classification Search
CPC ...... F25D 31/007; F25D 17/065; F25D 29/00; F25D 2331/803; F25D 2331/805; F25D 2331/28; F25D 2400/28; F25D 2400/30; F25D 17/06; F25D 19/00; F25D 31/003; F25D 13/065; A23L 3/36
USPC ........................................................ 62/457.4
See application file for complete search history.

(56) References Cited

U.S. PATENT DOCUMENTS

| | | | |
|---|---|---|---|
| 2,013,029 A | 9/1935 | Byer | |
| 5,222,367 A | 6/1993 | Yamada | |
| 2010/0132831 A1* | 6/2010 | Waroux | ................ B65B 31/047 141/66 |

FOREIGN PATENT DOCUMENTS

| | | |
|---|---|---|
| BR | PI0111168-0 | 2/2006 |
| BR | 1120120020668 | 7/2009 |
| JP | 2001292753 A | 10/2001 |

(Continued)

*Primary Examiner* — Cassey D Bauer
*Assistant Examiner* — Birhanu Damtew Weldetensi
(74) *Attorney, Agent, or Firm* — Hoglund & Pamias, PSC; Roberto J. Rios (57) ABSTRACT

This invention describes a device that is able to promote the rapid cooling/freezing of liquids and pasty and solid foods in general, where it is formed by several components that enable the action of cooling/freezing. Additionally, this invention describes that this device can incorporate the additional function of a refrigerator, through direct coupling of a thermal box to the cooling system of the device.

16 Claims, 10 Drawing Sheets

(56) References Cited

FOREIGN PATENT DOCUMENTS

WO      2011/012902 A9      2/2011
WO      2015/112192 A1      7/2015

* cited by examiner

Figura 10

RAPID COOLING DEVICE

FIELD OF THE INVENTION

This invention applies to the field of devices that are developed with the purpose of providing practicality when cooling/freezing beverages and pasty and solid foods in general.

This invention describes a device of simplified use that is able to quickly and instantaneously cool drinks and/or food, which can be used in various environments—hotels, restaurants, pharmaceutical laboratories, at home—and, additionally, it has a thermal box as an accessory compartment, which functions as a portable refrigerator.

BACKGROUND OF THE INVENTION

Although there are already several cooling and freezing techniques, the research that has been carried out has the intention of developing devices that replace the need for continuous use of energy. Thus, the present invention is related to the rapid cooling of drinks and food which is done by a device that promotes energy saving, since it only comes into operation when necessary. Thus, this device makes it possible to freeze only what is consumed and eliminates the need to maintain large stocks of frozen products.

The Brazilian document BR1120120020668 refers to improvements related to cooling, where a device for cooling beverages in containers, such as cans or bottles, is described.

Document WO2011012902 describes an appliance responsible for cooling improvements, in particular for cooling beverages in cans or bottles. This document also reveals that said device has a cavity to receive the product that will be cooled and means of rotation to rotate the product at a speed of 90 rpm.

Although the above documents are also in the field of rapid refrigeration, this invention differs from the documents analyzed here, because in addition to being intended for the cooling of both beverages and food, it provides more detailed and efficient technical descriptions of the device responsible for the cooling, such as the temperature limits obtained, energy consumption, the time required for refrigeration and the exact dimensions of the device.

Document PI0111168-0 describes a method of cooling to promote the rapid cooling and/or freezing of beverages and food.

Although the above mentioned document also has as objective the fast cooling of beverages and food, it differs from this invention since, in addition to the devices having distinct technical operation characteristics, this invention has an accessory thermal box with the function of a portable refrigerator that is not present in the above mentioned document.

Additionally, this invention also differs from the other documents mentioned above due to the fact that it keeps the coil, the antifreeze and the container to be frozen in the same cavity, thus dismissing problematic components and operations at very low temperatures and directly interfering with the energy efficiency and heat exchange of the device.

SUMMARY OF THE INVENTION

This device is very useful in several activities/segments, for example:

At home, it provides convenience, as it supplies the cold beverage in the right amount for consumption and at any time, without the need to anticipate its cooling.

Additionally, it quickly cools/freezes a portion of food which is then stored in the refrigerator, ensuring its conservation for a longer period of time.

At parties, it eliminates the need to predict the amount of beverages that will be put to chill, as it can be chilled at the exact moment it is consumed.

In convenience stores, it promotes the turning off of refrigerators that need to be kept turned on continuously, even during hours without any sales, allowing significant savings in energy and equipment, since beverages can be stored at room temperature promoting their rapid chilling only after the consumer's choice.

In hotels, it replaces minibars and eliminates the frequent complaints from hotel owners that the minibars do not generate profit due to energy expenditure in low season periods associated with the difficulty of controlling product consumption by users, since they can be purchased in markets and only chilled in the room, not generating sales.

In pharmaceutical laboratories, food laboratories, etc. the device can be used to cool/freeze samples at optimum temperature or impose sudden temperature drop in the performance of certain tests and can help to speed up lyophilization and sublimation processes.

In business environments, commercial rooms and stores the device can replace traditional drinking fountains that need to keep a cylindrical reservoir constantly chilled, even without frequent use causing a waste of energy.

This invention describes a device that is capable of promoting the rapid cooling/chilling of liquids and food, where it is formed by several components that enable the cooling/chilling action.

Additionally, this device can incorporate the additional function of a refrigerator, through direct coupling of a thermal box to the cooling system of the device.

BRIEF DESCRIPTION OF THE DRAWINGS

The invention can be better understood through the brief description of the pictures below:

FIG. 10 represents a perspective view of the cup used in the rapid cooling device.

DETAILED DESCRIPTION OF THE INVENTION

This invention describes a device that is intended to promote the rapid cooling/chilling of liquids and food. This device has a simplified and safe use and, therefore, can be operated by consumers of any age group.

This device brings convenience and generates energy savings for homes, businesses, events and camps, since it only comes into operation when necessary.

This device includes the following components: fan (1); condenser (2), gas piping (3); compressor (4); thermal insulation (5); antifreeze area (6); evaporator coil (7); rotating base (8); placement and extraction motor (9); container (10); compartment (11); traction shell (12); spindle (13); motor (14); return springs (15); spring guides (16); and motor support (17).

The fan (1), the condenser (2), the gas piping (3), the compressor (4) and the coil (7) are components of a common cooling system and are responsible for cooling the gas pumped into the condenser, for cooling the gas before entering the coil, for conducting the gas through the cooling circuit, for pumping the gas, and for cooling and expanding the gas, respectively; the thermal insulation (5) is responsible for thermally insulating the coil (7) and the antifreeze from the external environment, at the same time that it forms the cylindrical cavity where the container (10) to be frozen is immersed; the antifreeze area (6) is an area where the antifreeze and coil are located; the rotating base (8) is a base where the container (10) to be frozen is supported and allows it to rotate; the placement and extraction motor (9) is the motor responsible for lowering and raising the system that supports the container (10); the compartment (11) is the part that supports the rotating base and connects it to the guides to carry out the placement and extraction of the container (10); the traction shell (12) is the part responsible for the traction/rotation of the container (10), while its specific shape protects the contact between the container (10) nozzle and the antifreeze; the spindle (13) is a thread that performs the movement of placing and extracting the system; the motor (14) is responsible for turning the container (10); the return springs (15) return the compartment and stabilize the placement and extraction system; the spring guides (16) are responsible for guiding both the springs and the other components of the placement and extraction system; and the motor support (17) supports the motor that rotates the traction shell (12) and connects it to the guides.

Figure 7:
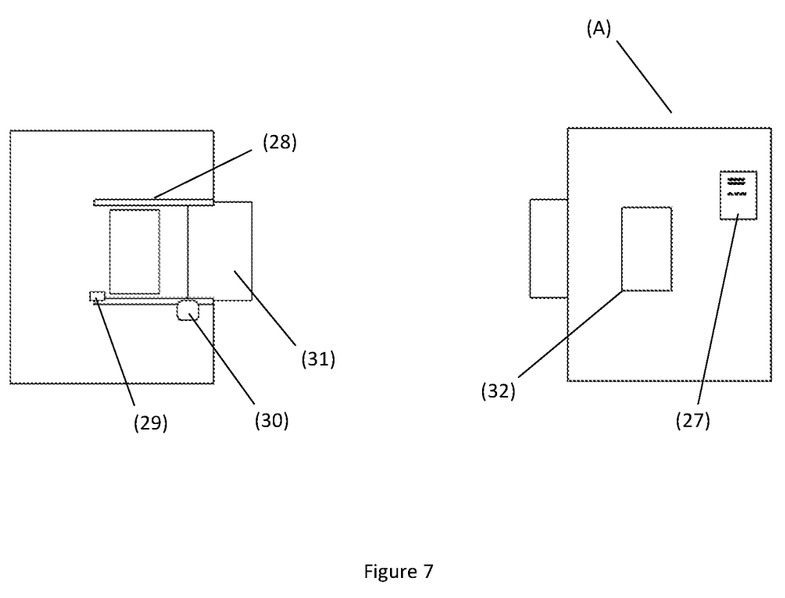
FIG. 7 represents a front and inside view of the front panel present in the rapid cooling device.
Figure 8:
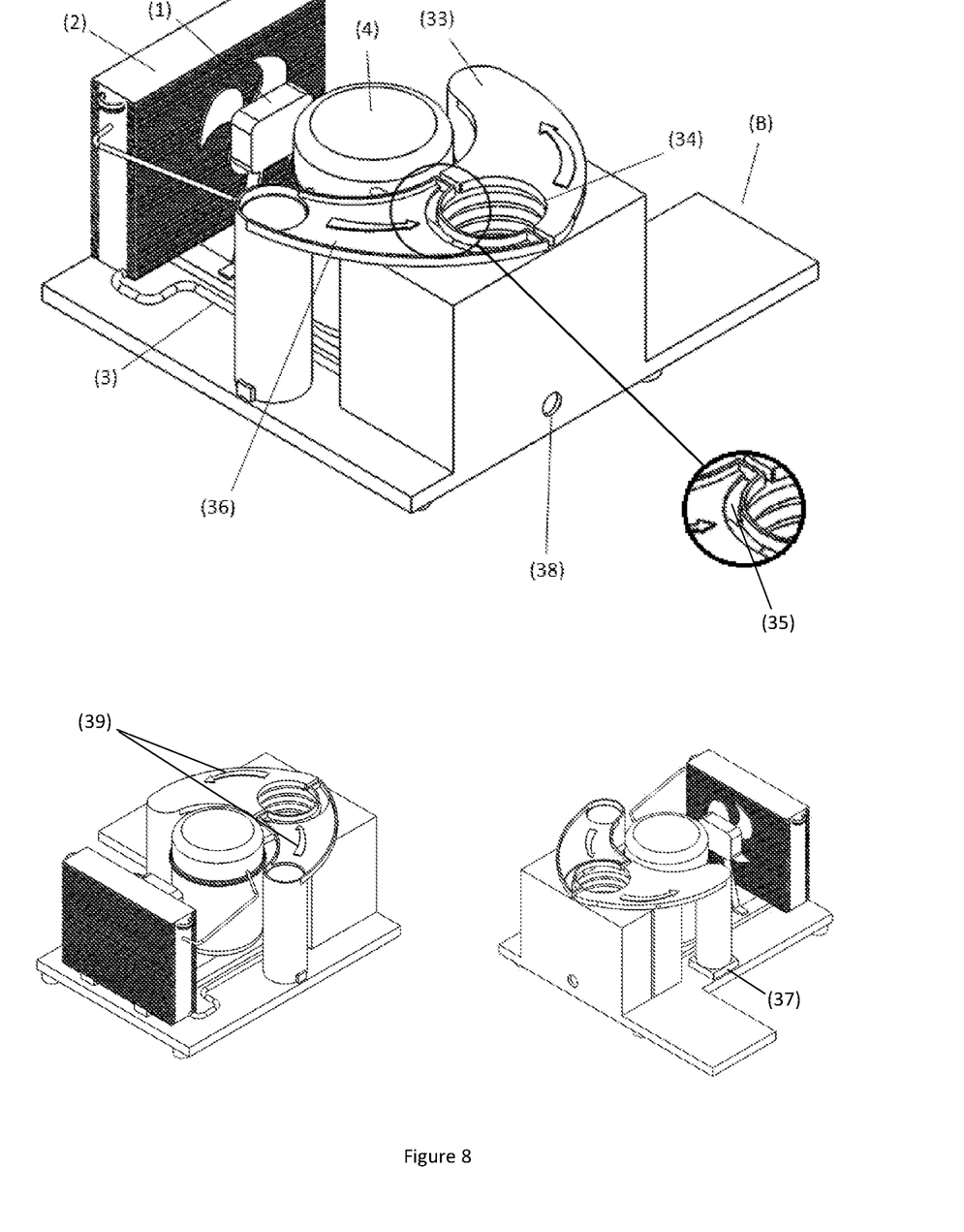
FIG. 8 represents a perspective view of the air circulation and drain system present in the rapid cooling device.

In addition, the device comprises a front panel (A) where there is a screen that presents the functions to the user and performs the electronic command of the equipment with the following components: control panel (27); door guides (28); door limit sensor (29); door actuation motor (30); protective door (31); and bottle entrance (32), and also an air circulation and drain system (B) that has as components: air inlet duct in the thermal box (33); air suction hole of the coil (34); air direction hole to the coil (35); thermal box air return duct (36); micro fan (37); and drain (38).

The control panel (27) is the component responsible for controlling all the functions of the rapid cooling device, through the said control panel (27) the user communicates with the said device and receives the signal from the sensors and controls the motors; the door guides (28) are rails that guide the door; the door limit sensor (29) is the sensor responsible for notifying that the device door is open; the door actuation motor (30) is responsible for opening and closing the device door; the bottle inlet (32) is the hole for placing and removing the container (10) by the user; the air inlet duct in the thermal box (33) is responsible for directing the cooled air through the coil (7) into the thermal box (23); the air suction hole of the coil (34) is the air passage directed from inside the coil (7) cavity into the air inlet duct in the thermal box (33); the air return duct in the thermal box (36) is the air return path that was present inside the thermal box (23) to the coil (7); the micro fan (37) is responsible for sucking air from inside the thermal box (23) into the device, through the air return duct in the thermal box (36); and drain (38) is a hole that is closed by a plug and will be used to help remove the antifreeze, when necessary.

When turned on, the device actuates the compressor (4), which starts to chill the evaporator coil (7) which is immersed in an antifreeze chemical solution, consisting of propylene glycol diluted between 35% and 100%, or distilled with 35% alcohol or alcohol diluted at 35%, and which is in the antifreeze area (6), which can also be called a cylindrical container, built with thermal insulation material, in which the antifreeze chemical solution can remain for several days without the need to change it, because it does not deteriorate for 30 days.

The cylindrical container can be cleaned by removing the assembly. To facilitate the exchange of the antifreeze solution, the cylindrical container has a drain (38) that serves to remove, when necessary, the antifreeze, located at the bottom base.

After the container (10) has been inserted into the compartment (11), the user activates the desired function on the control panel (27), starting the device which is equipped with a rotating base (8) and equipped with a protective door (31) system with automated operation.

After the ideal operating temperature is reached between −2 to −40° C., more specifically between −33° C. to −40° C., a light signal on the control panel (27) will indicate that the device is ready for use, starting the cooling process by automatically closing the protective door (31), which slides horizontally between the door guides (28), driven by the door actuation motor (30).

The limit sensor (29), which is a safety device, prevents the start of the process until the protective door (31) is closed completely.

Thus, once the door is completely closed, the container (10) to be cooled, arranged on the rotating base (8), will be immersed in the previously cooled antifreeze solution at a temperature between −2 to −40° C., which will be immersed by the action of the placement and extraction motor (9) of the product and which drives the spindle (13) rotation and drags the motor (14) and the motor support (17) down, sliding vertically through the spring guides (16).

The anatomically shaped traction shell (12) has the function of accommodating and pulling containers of different contours, in addition to insulating the container (10) nozzle from contact with the antifreeze solution. The said traction shell (12) is attached to the motor (14) shaft and adjusts to the container (10) and leads it to the end of the spindle (13) stroke, together with the rotating base (8), which is held suspended by the return springs (15). This stroke limit is important so that the antifreeze solution, when receiving the container (10), raises its level to the traction shell (12) or covers it, increasing the contact surface and thermal exchange between the coil and the container (10), thus reducing energy consumption and process time.

After the immersion of the container (10) in the antifreeze solution, the rotation of the container arranged on the rotating base (8) starts, through the action of the motor (14).

The acceleration of the product contained in the container (10) reduces the cooling time through the centrifugation movement that projects the hottest content from the center to the cold sides of the container (10), performing the heat exchange in relation to the product contained in it. At the same time the rotation movement will agitate the antifreeze solution on the outside, creating a similar thermal exchange effect in relation to the evaporator coil (7).

The rotation will be automatically maintained at a speed that can vary between 85 to 100 RPM, preventing inadequate rotating centrifugation from interfering with the movement of the volume inside the container (10) and reducing the agitation and contact of the antifreeze solution with the outside surface of the container (10), impairing the cooling/freezing process and causing increased energy consumption.

In addition, the lower rotation causes ice walls to form inside the container and compromises the process. The eventual formation of small crystals in the inner part of the container (10) proved beneficial to the process, helping in the agitation and disappearing almost instantly at the end of the process.

At the end of the process, the container (10) will be raised to its original position with the automatic reversal of the placement and extraction motor (9) and, with the aid of the return springs (15), will cause the automatic opening of the protective door (31) to allow the product to be removed from the compartment (11), thus finishing a complete process cycle. For a second cycle it will no longer be necessary to wait for the equipment to reach operating temperature, as the antifreeze temperature is brought back to this temperature even before removing and replacing the second container.

The return springs (15) carry out the return by lifting the rotating base (8) and creating stability for the placement and extraction motor system (9) of the container (10) containing the product.

Figure 1:
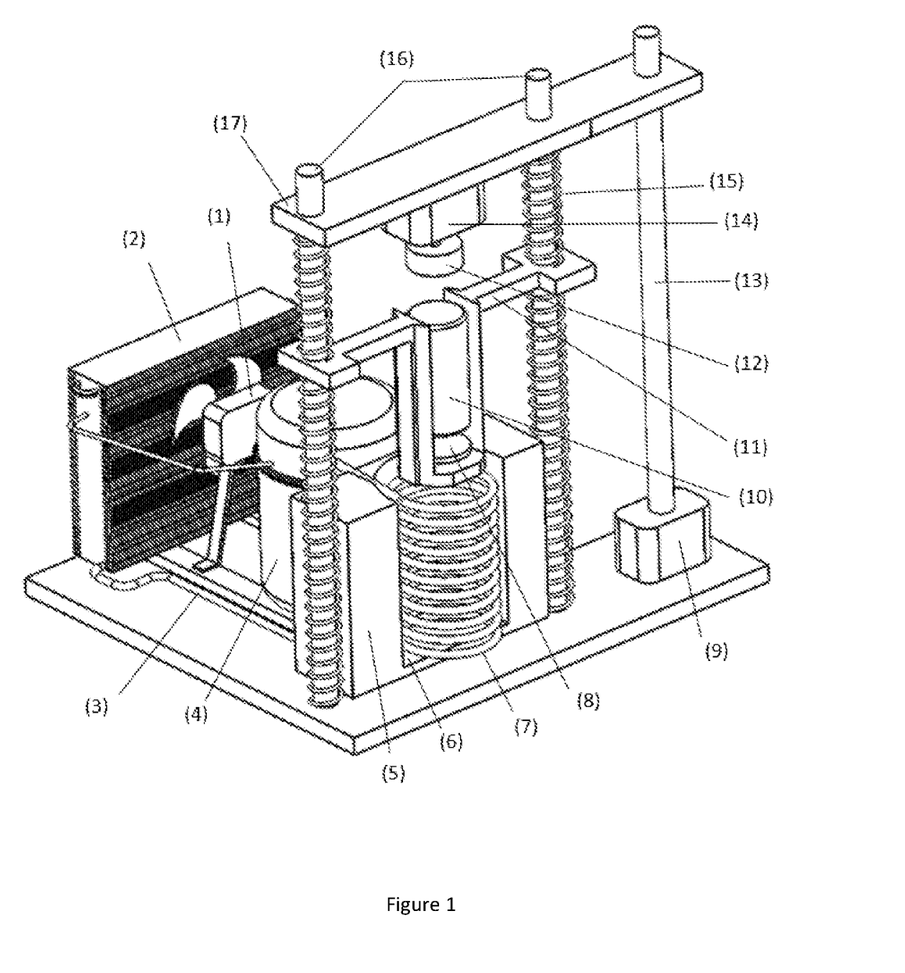
FIG. 1 represents a perspective view of the rapid cooling device.
Figure 2:
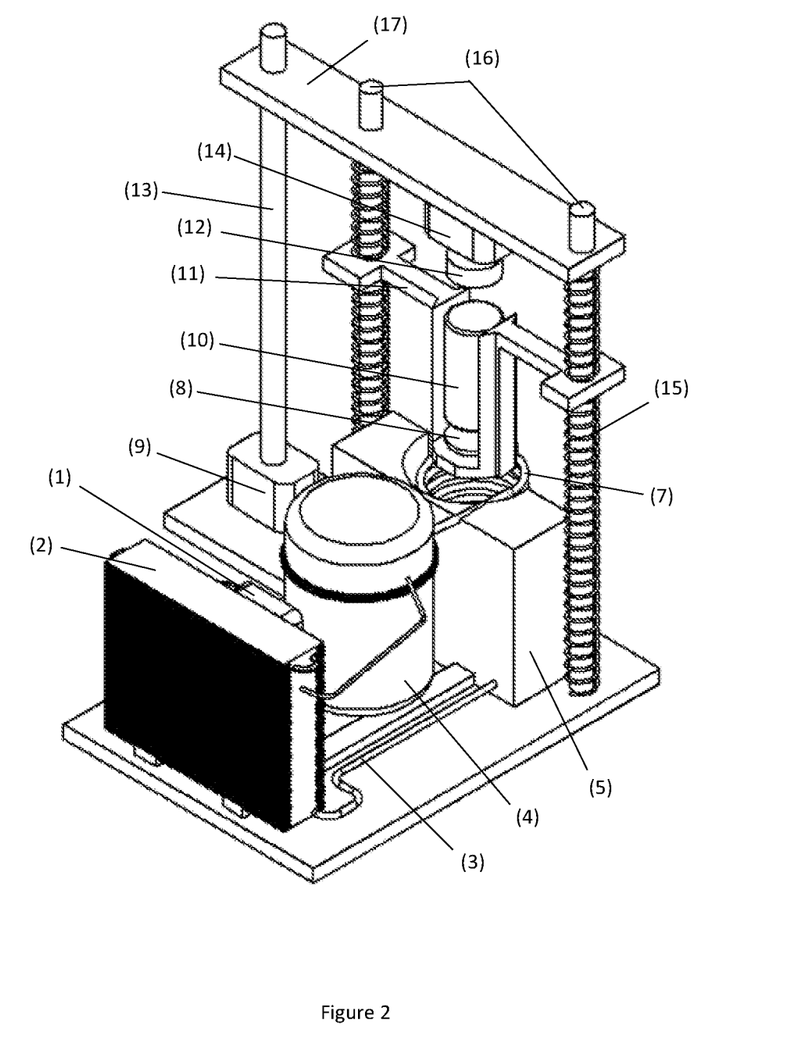
FIG. 2 represents a second perspective view of the rapid cooling device.
Figure 3:
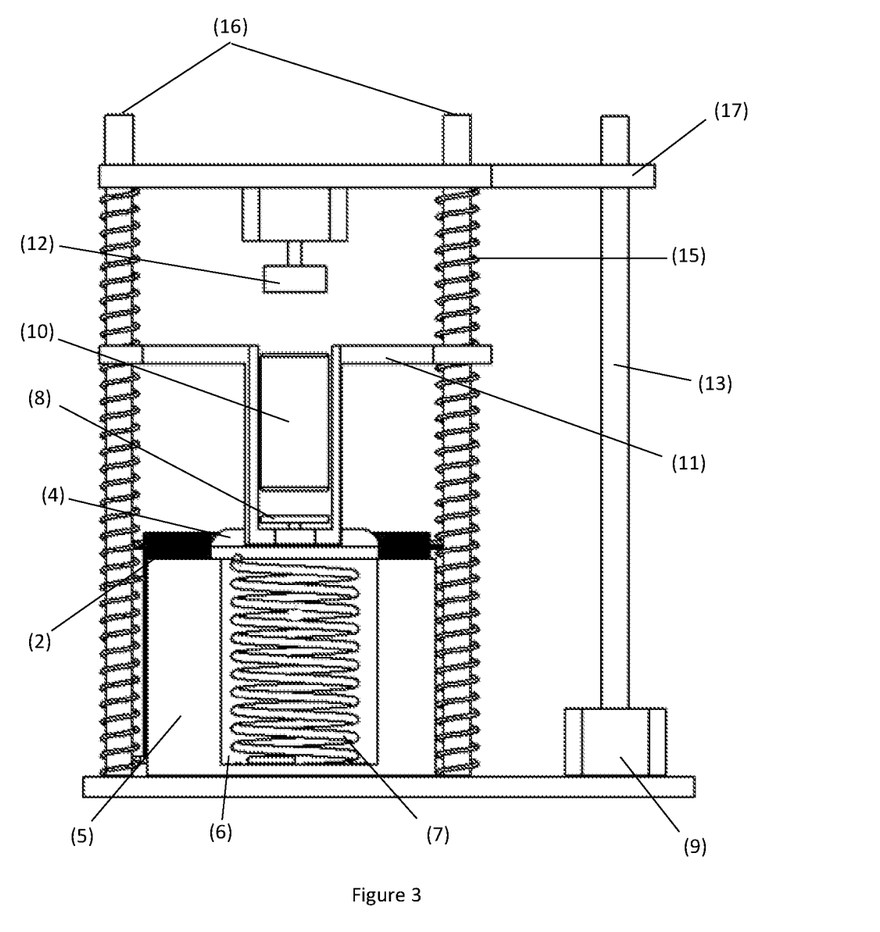
FIG. 3 represents a front view of the rapid cooling device.
Figure 4:
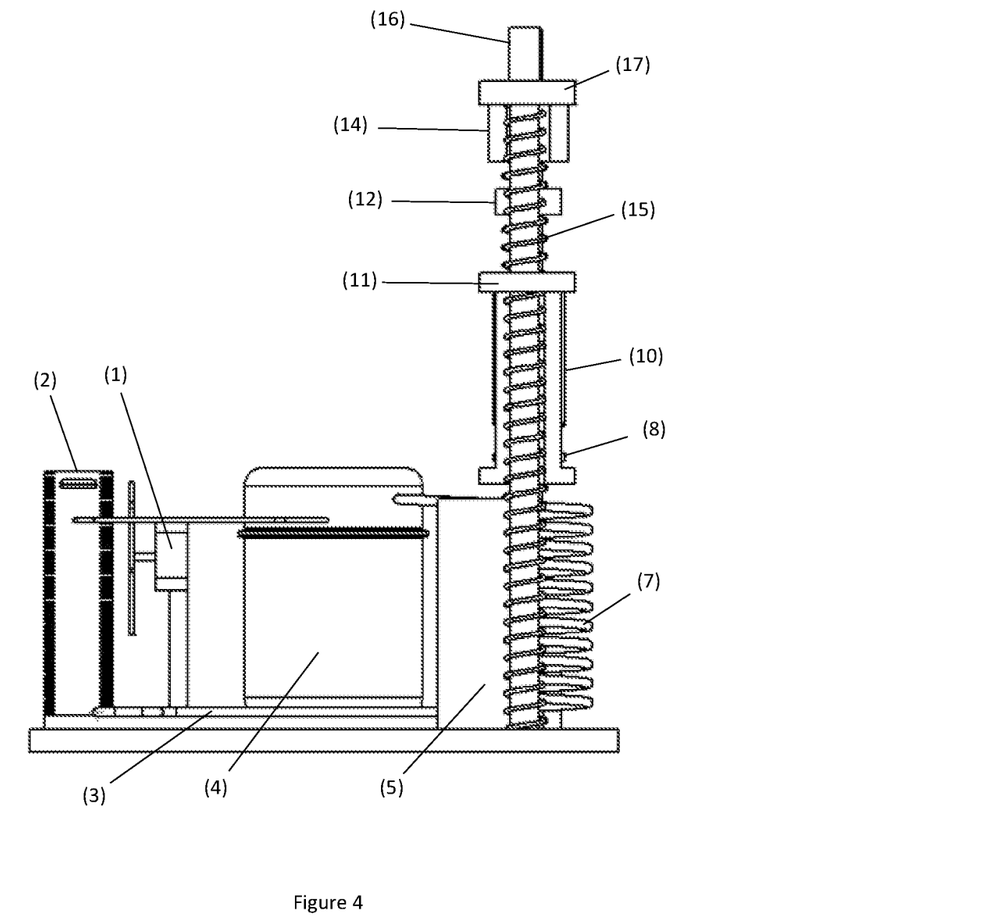
FIG. 4 represents a right-side view of the rapid cooling device.
Figure 5:
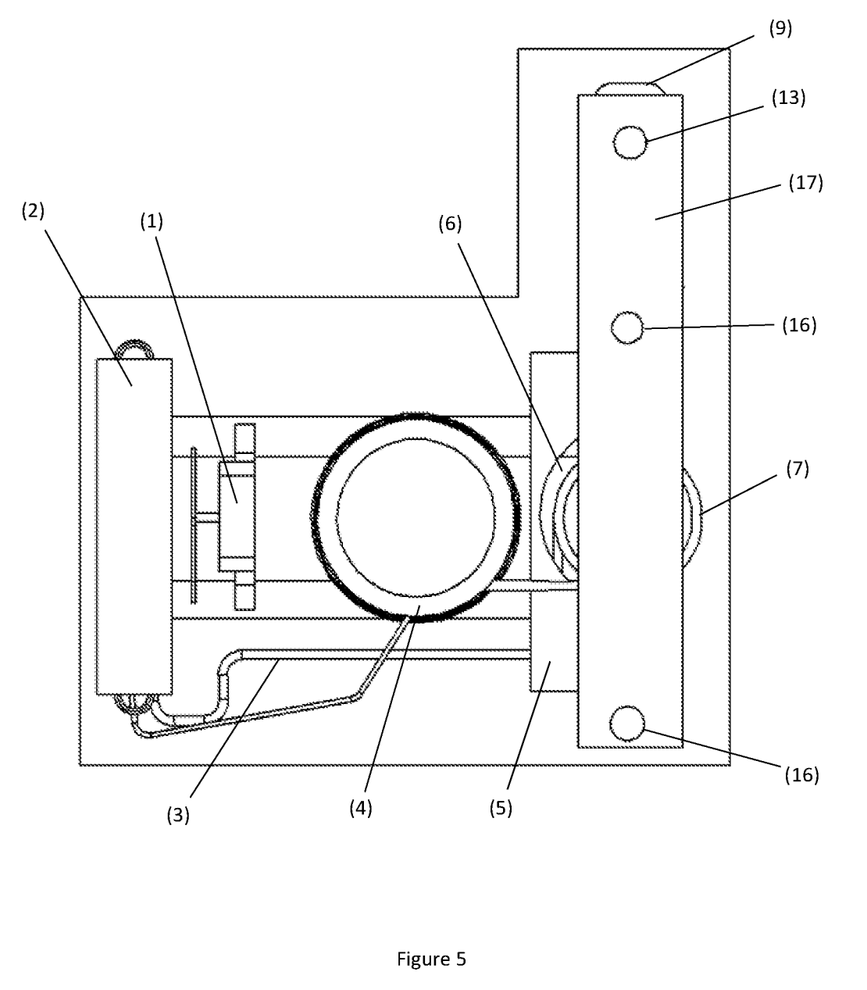
FIG. 5 represents a top view of the rapid cooling device.
Figure 6:
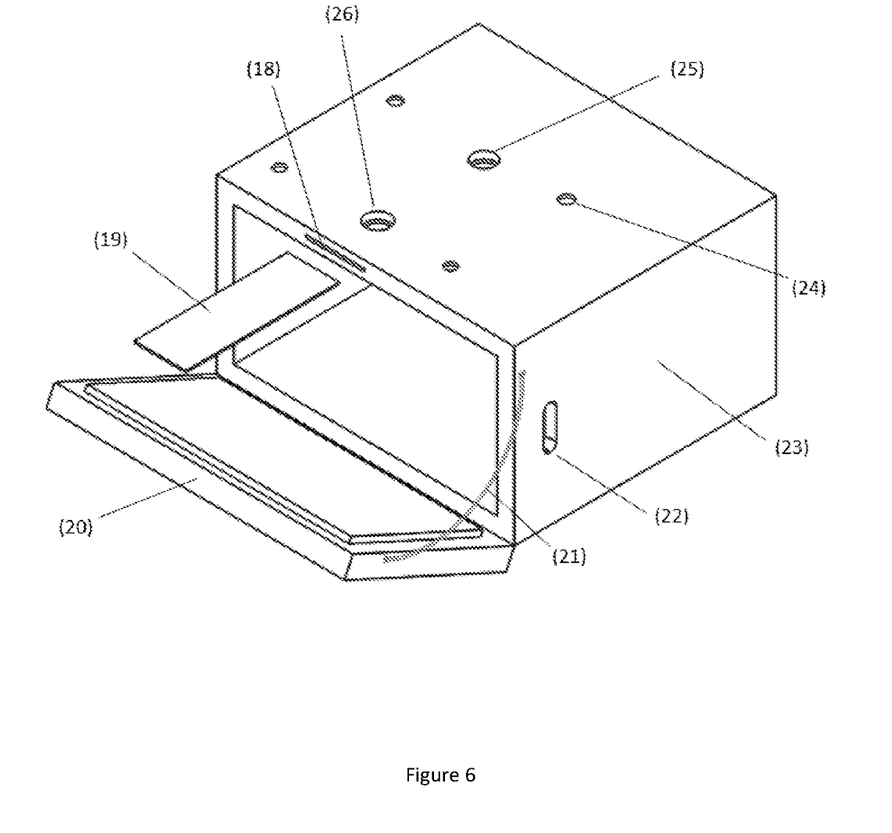
FIG. 6 represents a perspective view of the thermal box.
Figure 9:
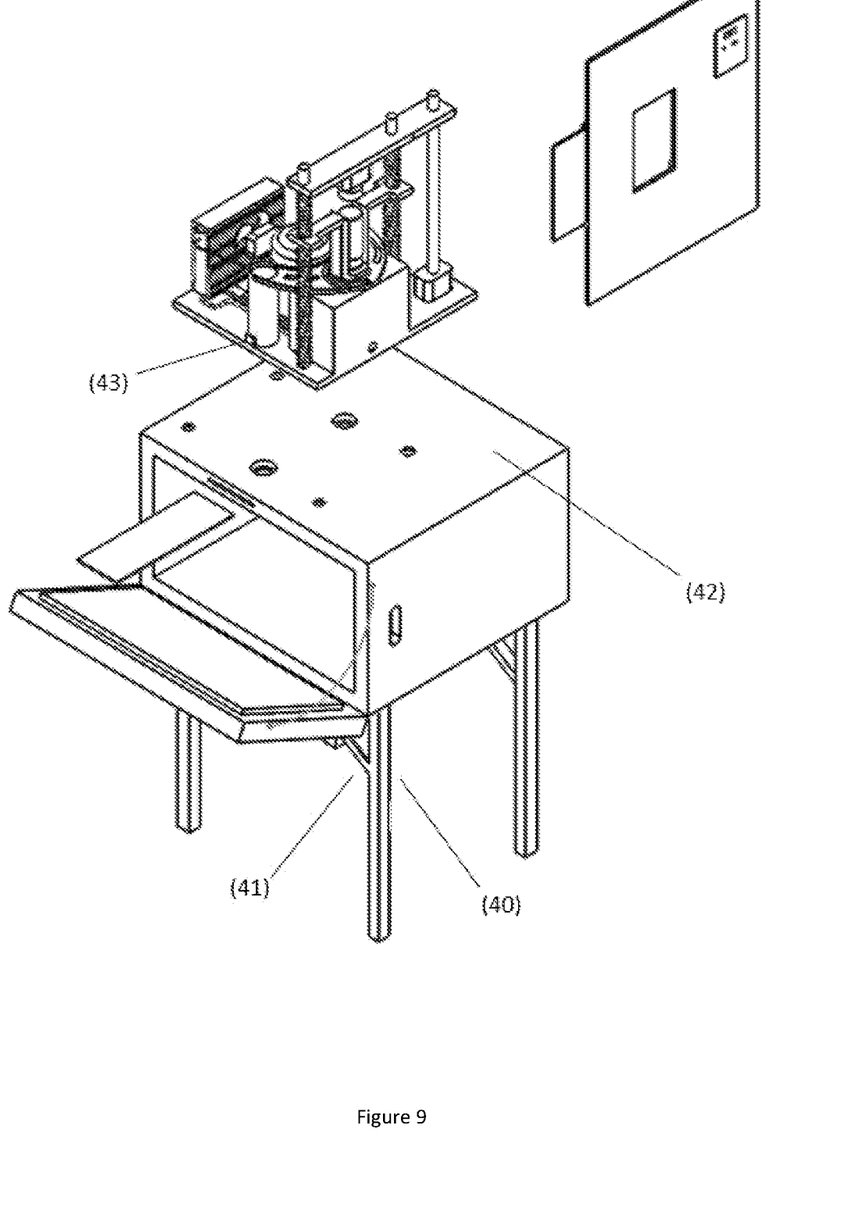
FIG. 9 represents a perspective view of the system formed by the rapid cooling device, thermal box and front panel.

Additionally, this device can incorporate the function of a refrigerator, through direct coupling of a thermal box (23) to the cooling system of the device, without losing its original function.

This thermal box (23)—that has as components: tab inlet hole (18); closing tab (19); cover (20); cover lock (21); catcher (22); foot fitting (24); cold air inlet hole (25); and cold air outlet hole (26)—has as purpose the storage of cold foods and/or containers for solids and liquids, including bottles of different sizes and formats, being of great utility as accessory device in homes, hotels, bars, restaurants and camps. In addition, the said thermal box (23) serves to accommodate the device for transportation and storage and can be positioned anywhere by opening the retractable feet (40) which are arranged at its bottom and have a lock (41) that keeps said retractable feet (40) armed without the risk of unexpected retraction.

The said closing tab (19) is responsible for closing the air inlets of the thermal box when they are not being used, thus preventing the entry of dirt and insects; the cover (20) is responsible for closing the thermal box (23) and serving as a support for it; the cover lock (21) is responsible for preventing the cover (20) from opening more than 90 degrees, thus allowing it to be used as a support; the catcher (22) is a component that facilitates the transportation of the thermal box (23); the foot fitting (24) keeps the thermal box (23) and the device aligned, so that there is perfect operation in refrigerator mode; the cold air inlet hole (25) is responsible for the entry of cooled air that comes from the coil (7); and the cold air outlet hole (26) is responsible for the passage of air that is in the thermal box (23) into the device.

It is important to note that for the refrigerator mode, the user must adjust the device in the holes (25 and 26) in the coupling face (42) and in the foot fitting (24) disposed in the thermal box (23) and, remove the closing tab (19) from the tab inlet hole (18), thus forming a new arrangement in a single set with the device, which will remain aligned with existing the ducts (36) and (33) inside the device through the which cold air circulation will be forced by means of a micro fan (37) automatically activated whenever the refrigerator mode is selected, and then the cold air will circulate through the thermal box (23) and return to the device, in the direction shown by the direction of the air flow (39), being introduced into the coil (7) through the air directing hole to coil (35) and sucked through the air suction hole of the coil (34), creating a continuous temperature transfer cycle from the coil to the thermal box (23), then transformed into a refrigerator, reaching temperatures ranging from +20° C. to −25° C., which are controlled by the temperature sensor (43) of the thermal box (23) installed in the air return duct (36).

It is worth mentioning that the use of the retractable feet (40) attached to the thermal box (23) assembly provides greater versatility and ergonomics in the use of the device, whose cover (20) with opening limited by the cover lock (21) serves as a support for the products in a position suitable for this purpose.

Another efficient action of the device requested here is the production of ice, through the use of a specific container in cylindrical format and removable cover. It should also be noted that this same container can be used to freeze any liquid you wish to introduce, or even to freeze small portions of solid or pasty food.

To produce ice quickly, simply insert the product to be frozen into the cup (44) suitable for this purpose, close the lid and insert it into the device, in the same compartment of the container (10), as any other bottle, selecting the desired temperature and starting the process.

It is worth mentioning that the aforementioned cup (44) is shaped like a 470 ml can and was developed to enable the use of the device with products that do not come in traditional packaging, i.e., that do not have a specific container (10), such as cans and/or bottles.

Another feature of the device described in this invention is the presence of a front panel (A), where the command is given by touch. The functions on this front panel (A) determine the operation mode of the device, such as: fast cooling, for beers and others; refrigerator, for use with the thermal box (23); freezing using the cup (44); and hotel mode. Among the commands that can be operated on the front panel (A), is the possibility of the user to choose the desired cooling temperature.

Additionally, when the rapid cooling device is used in hotels, a pre-selection command present on the front panel (A) can be added, where the products available in the room will already be pre-programmed in the device and, as soon as the customer chooses to cool a 350 ml beer can, for example, the reception will already be informed of the consumption of this product.

Another possibility is to program the device to remain in standby mode and to be activated for new operations for the time predetermined by the user.

If a new operation is not started, the compressor will be automatically switched off until the device is triggered again by the user. The use of this function is aimed at saving energy, especially at parties, where the consumption of beverages is higher at the beginning of the event, preventing the device from being idle consuming energy without demand or staying connected at the end of the event.

The rapid cooling device described in this invention uses a refrigerant gas R 404A and the rotation speed of the bottle is 85 to 100 RPM.

In addition, it takes 1 minute to cool a 350 ml can, and the time to reach the operating temperature again is 10 seconds.

If the device is turned off too long, it will take 3 minutes to reach the operating temperature.

Illustrative Examples

The device has undergone a series of tests to verify its functionality and speed, as follows:

1—A standard cooling system was used with a spiral coil in horizontal position wrapped with insulating material, then the container was introduced into the center of the spiral. The result was unsatisfactory both in time and temperature.

2—The coil was positioned vertically, and the cylindrical container was filled with alcohol. This greatly reduced the temperature of the can, but the time was still not satisfactory, and the smell of alcohol was impregnated in the can.

3—Alcohol has been replaced by water and salt to eliminate the smell. This brought the problem that the edge of the can became salty, causing discomfort to drink directly from the can. Then, the refrigeration system was better regulated so that lower temperatures were reached, but the freezing of the saltwater occurred.

4—Salt water was replaced by propylene glycol and thus the freezing was eliminated.

5—To improve the process, the container was rotated at 300 RPM and the edges were frozen.

6—Thus, the rotation was lowered to 50 RPM and the freezing was lower, but still unsatisfactory.

7—With the rotation at 150 RPM, a partial freezing was obtained in the lower part of the container.

8—At 100 RPM a thin ice layer was formed on the walls of the container that could not be measured.

9—At 75 RPM the ice layer was higher.

10—At 85 RPM the ice layer was equal to that obtained in the test at 100 RPM. Thus, the rotation was kept within 85/100 RPM.

11—The sizes of the coil, the cylindrical container cavity and the amount of antifreeze solution were doubled, and two containers were introduced simultaneously. The time was expected to be less than 2× the time of the test with one container, which was not confirmed. Thus, it was concluded that the thermal exchange was at a point very close to maximum, as the time was only 5 seconds shorter.

12—The cooling system has been changed to a lower power motor. This has not decreased the energy consumption per container. Although the time inside the cylindrical container cavity does not change much, the time to reach the operating temperature has increased. This did not bring important advantages and highlighted the efficiency of thermal exchange.

13—The process was resumed using only one container and it was tested with 473 ml beer cans. An increase in time almost proportional to the increase in the container (can) volume was obtained.

Thus, after the test referred to above, a final result was obtained that was considered satisfactory, in which: for 350 ml cans, the initial temperature was 22° C., the final temperature was −7° C., and the time for cooling was 1 minute. For 473 ml cans, the cooling time was 1 minute and 25 seconds.

The present invention was revealed in this descriptive report in terms of its preferred modality and proved highly efficient in these applications. However, other modifications and variations are possible from the present description and are still within the scope of the invention revealed here.

The invention claimed is:

1. A rapid cooling device comprising:
   a cooling system including a fan (1), a condenser (2), gas piping (3); a compressor (4) and an evaporator coil (7);
   a placement and extraction motor (9) coupled to a spindle (13) that is in turn coupled to a motor support (17) having a motor (14) mounted therein, wherein a traction shell (12) is coupled to said motor (14) and spring guides (16) with return springs (15) are coupled to said motor support (17);
   a compartment (11) housing a rotating base (8) configure to receive and support a container (10); and
   thermal insulation (5) enclosing an antifreeze area (6) that contains said evaporator coil (7), wherein said compartment (11) is selectively lowered into and raised from the evaporator coil (7) of said antifreeze area (6).

2. The rapid cooling device according to claim 1, further comprising a front panel (A) and an air circulation and drain system (B).

3. The rapid cooling device according to claim 1, wherein the evaporator coil (7) of said antifreeze area (6) is immersed in an antifreeze chemical solution.

4. The rapid cooling device according to claim 3, wherein said antifreeze chemical solution comprises propylene glycol diluted between 35% and 100%.

5. The rapid cooling device according to claim 3, wherein said antifreeze chemical solution is pre-cooled to a temperature between −2 to −40° C.

6. The rapid cooling device according to claim 3, wherein said antifreeze chemical solution is pre-cooled to a temperature between −33° to −40° C.

7. The rapid cooling device according to claim 1, wherein the rotating base (8) allows the container (10) to rotate at a speed between 85 and 100 RPM.

8. The rapid cooling device according to claim 3, wherein the traction shell (12) isolates a nozzle of the container (10) from the antifreeze chemical solution, serves to move said container (10) and has a shape configured to accommodate the contour of the container (10) promoting the rotation of said container (10).

9. The rapid cooling device according to claim 2, wherein the front panel (A) comprises:
   a bottle entry (32);
   a protective door (31) slidably mounted on door guides (28);
   a door actuation motor (30) coupled to said protective door (31);
   a door limit sensor (29); and
   a control panel (27).

10. The rapid cooling device according to claim 2, wherein said air circulation and drain system (B) comprises:
    an air return duct (36) provided to receive air coming from a thermal box (23);
    an air direction hole (35) directing said received air into said evaporator coil (7);
    an air suction hole (34) directing air cooled inside said evaporator coil (7) into an air inlet duct (33) provided to direct said cooled air into said thermal box (23);
    a micro fan (37) provided to blow said air coming from the thermal box (23) into said air return duct (36).

11. The rapid cooling device according to claim 2, further comprising a drain (38) provided to drain an antifreeze chemical solution inside said antifreeze area (6).

12. The rapid cooling device according to claim 10, wherein said thermal box (23) comprises:
- a cover (20) provided to close said thermal box (23);
- a cover lock (21) coupled to said cover (20);
- a cold air inlet hole (25) receiving said cooled air from the air inlet duct (33);
- a cold air outlet hole (26) directing air inside said thermal box (23) into said air return duct (36);
- a tab inlet hole (18) providing access to said cold air inlet hole (25) and said cold air outlet hole (26);
- a closing tab (19) configured to be inserted into said tab inlet hole (18) so that said cold air inlet hole (25) and said cold air outlet hole (26) are selectively closed;
- a catcher (22) coupled to said thermal box (23) for facilitating transportation; and
- a foot fitting (24) configured to receive said rapid cooling device.

13. The rapid cooling device according to claim 10, wherein said thermal box (23) functions as a refrigerator.

14. The rapid cooling device according to claim 12, wherein said cover lock (21) prevents the cover (20) from opening more than 90°.

15. The rapid cooling device according to claim 10, wherein said thermal box (23) further comprises retractable feet (40) with locks (41).

16. The rapid cooling device according to claim 1, wherein said antifreeze chemical solution remains undeteriorated for a period of up to 30 days.

\* \* \* \* \*